US012395912B2

(12) United States Patent
 Liu et al.

(10) Patent No.: US 12,395,912 B2
(45) Date of Patent: Aug. 19, 2025

(54) MOBILITY LOAD BALANCING IN WIRELESS COMMUNICATION NETWORK

(71) Applicant: QUALCOMM Incorporated, San Diego, CA (US)

(72) Inventors: Huichun Liu, Beijing (CN); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 839 days.

(21) Appl. No.: 17/639,319

(22) PCT Filed: Jan. 30, 2020

(86) PCT No.: PCT/CN2020/074077
 § 371 (c)(1),
 (2) Date: Feb. 28, 2022

(87) PCT Pub. No.: WO2020/156498
 PCT Pub. Date: Aug. 6, 2020

(65) Prior Publication Data
 US 2022/0322175 A1 Oct. 6, 2022

(30) Foreign Application Priority Data
 Jan. 31, 2019 (WO) ............... PCT/CN2019/074262

(51) Int. Cl.
 *H04W 36/22* (2009.01)
 *H04W 28/08* (2023.01)
 (Continued)

(52) U.S. Cl.
 CPC ........... *H04W 36/22* (2013.01); *H04W 28/08* (2013.01); *H04W 28/0862* (2023.05);
 (Continued)

(58) Field of Classification Search
 CPC ....... H04W 36/00837; H04W 28/0862; H04W 36/08; H04W 36/22; H04W 28/08;
 (Continued)

(56) References Cited

U.S. PATENT DOCUMENTS

2013/0322238 A1* 12/2013 Sirotkin ................. H04N 21/00
 370/230
2015/0111575 A1* 4/2015 Lei ......................... H04W 36/22
 455/436

(Continued)

FOREIGN PATENT DOCUMENTS

CA 3066273 C * 4/2022 ........ H04W 36/0027
CN 101772094 A 7/2010
 (Continued)

OTHER PUBLICATIONS

CMCC: "Initial Consideration on 5G SON Functions", 3GPP TSG-RAN WG3 Meeting #101bis, R3-186038, Chengdu, China, Oct. 8, 2018-Oct. 12, 2018, Oct. 12, 2018 (Oct. 12, 2018), 3 Pages, Section 2.2.

(Continued)

*Primary Examiner* — Joseph E Avellino
*Assistant Examiner* — Adam Joel Cerlanek
(74) *Attorney, Agent, or Firm* — Harrity & Harrity, LLP

(57) ABSTRACT

Various aspects of the present disclosure generally relate to wireless communication. In some aspects, a wireless communication device may transmit a resource status request requesting load information related to load balancing between the wireless communication device and one or more other wireless communication devices. The wireless communication device may receive a resource status response including the load information in response to the request. In other aspects, a User Equipment (UE) may receive a Radio Resource Control (RRC) configuration (Continued)

including a set of target cells for a conditional handover procedure and load information of the target cells. The UE may select a target cell from the set of target cells for the conditional handover procedure based at least on the load information of the target cells. Numerous other aspects are provided.

30 Claims, 16 Drawing Sheets

(51) Int. Cl.
    *H04W 28/086* (2023.01)
    *H04W 36/00* (2009.01)
    *H04W 36/08* (2009.01)
    *H04W 36/36* (2009.01)

(52) U.S. Cl.
    CPC ... *H04W 36/00838* (2023.05); *H04W 36/085* (2023.05); *H04W 36/362* (2023.05)

(58) Field of Classification Search
    CPC ....... H04W 28/0861; H04W 36/00838; H04W 36/085; H04W 36/362; H04W 40/34; H04W 88/085; H04W 92/20; H04W 48/20; H04W 24/10; H04W 92/045
    See application file for complete search history.

(56) References Cited

U.S. PATENT DOCUMENTS

2018/0368205 A1* 12/2018 Park ............... H04W 76/32
2022/0248291 A1* 8/2022 Park ............... H04W 76/27

FOREIGN PATENT DOCUMENTS

| CN | 102065463 A | 5/2011 | |
|---|---|---|---|
| CN | 102131237 A | 7/2011 | |
| EP | 2416605 A1 * | 2/2012 | ............ H04W 28/08 |
| GB | 2526617 A * | 12/2015 | ............ H04W 28/08 |
| WO | WO-2010105422 A1 | 9/2010 | |
| WO | WO-2018227473 A1 * | 12/2018 | ............ H04L 41/06 |

OTHER PUBLICATIONS

International Search Report and Written Opinion—PCT/CN2019/074262—ISA/EPO—Aug. 29, 2019.
International Search Report and Written Opinion—PCT/CN2020/074077—ISAEPO—Apr. 26, 2020.
IT DOCOMO, Inc.: "Use Cases for RAN Centric-Data Utilization", 3GPP TSG-RAN WG3 RAN3#101bis, R3-185679, Chengdu, China, Oct. 8, 2018-Oct. 12, 2018, Oct. 12, 2018 (Oct. 12, 2018), 4 Pages, Section 2.2, Figure 2.
Supplementary European Search Report—EP20748837—Search Authority—The Hague—Dec. 22, 2022.
Supplementary Partial European Search Report—EP20748837—Search Authority—The Hague—Sep. 19, 2022.
Taiwan Search Report—TW109102767—TIPO—Feb. 16, 2023.

* cited by examiner

MOBILITY LOAD BALANCING IN WIRELESS COMMUNICATION NETWORK

CROSS REFERENCE

The present Application for patent claims the benefit of PCT International Application No. PCT/CN2019/074262 by Liu et at, entitled "Mobility Load Balancing in Wireless Communication Network," filed Jan. 31, 2019, assigned to the assignee hereof, and expressly incorporated by reference in its entirety herein.

FIELD OF THE DISCLOSURE

Aspects of the present disclosure generally relate to wireless communication, and more particularly to techniques and apparatuses for mobility load balancing in wireless communication network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

Mobility load balancing may include operations and/or procedures performed within a wireless communication network to balance communication load among wireless communication devices, such as base stations. For example, load balancing procedures may be performed to balance load between base stations by adjusting handover and cell reselection parameters based on the respective loadings of the base stations. In NR, additional features, such as mmWave beam utilization, supplemental uplink, additional Radio Resource Control (RRC) states, Central Unit (CU)-Distributed Unit (DU) split, and etc. are introduced. As such, improved mobility load balancing procedures may be needed to implement these additional features.

In some aspects, load information communication procedures may be performed by wireless communication devices to communicate or spread load information between wireless communication devices within a wireless communication network. In an example, load information may be communicated via an Xn interface between an NR base station and another NR base station or between an NR base station and an enhanced LTE base station. In another example, load information may be communicated via an $X_2$ interface between an NR base station and an eNB base station. In still another example, load information may be communicated via an $F_1$ interface between Distributed Units (DU) in an NR base station to balance load among the DU's. In yet another example, load information may be communicated via an $N_2$ and/or $S_1$ interface between a base station and a core network. In yet still another example, load information may be communicated via an LTE Uu interface between a base station and a user equipment for conditional handover target cell selection. In other aspects, new Xn messages are proposed for negotiation of handover trigger change between base stations.

In some aspects, a method of wireless communication may include transmitting, from a wireless communication device, a resource status request requesting load information related to load balancing between the wireless communication device and one or more other wireless communication devices. The method also may include receiving a resource status response including the load information in response to the request.

In some aspects, an apparatus of wireless communication may include means for transmitting, from a wireless communication device, a resource status request requesting load information related to load balancing between the wireless communication device and one or more other wireless communication devices. The apparatus may further include means for receiving a resource status response including the load information in response to the request.

In some aspects, an apparatus for wireless communication may include memory and one or more processors operatively coupled to the memory. The memory and the one or more processors may be configured to transmit, from a wireless communication device, a resource status request requesting load information related to load balancing between the wireless communication device and one or more other wireless communication devices. The memory and the one or more processors may further be configured to receive a resource status response including the load information in response to the request.

In some aspects, a method of wireless communication at a User Equipment (UE) may include receiving a Radio Resource Control (RRC) configuration including a set of target cells for a conditional handover procedure and load information of the target cells. The method may further include selecting a target cell from the set of target cells for the conditional handover procedure based at least on the load information of the target cells. The method may also include performing the conditional handover procedure to transfer from a source cell to the target cell.

In some aspects, an apparatus of wireless communication may include means for receiving, at a User Equipment (UE), a Radio Resource Control (RRC) configuration including a set of target cells for a conditional handover procedure and load information of the target cells. The apparatus also may include means for selecting, at a User Equipment (UE), a target cell from the set of target cells for the conditional handover procedure based at least on the load information of the target cells. The apparatus further may include means for performing, at a User Equipment (UE), the conditional handover procedure to transfer from a source cell to the target cell.

In some aspects, an apparatus for wireless communication may include memory and one or more processors operatively coupled to the memory. The memory and the one or more processors may be configured to receive, at a User Equipment (UE), a Radio Resource Control (RRC) configuration including a set of target cells for a conditional handover procedure and load information of the target cells. The memory and the one or more processors may be configured to select, at the UE, a target cell from the set of target cells for the conditional handover procedure based at least on the load information of the target cells. The memory and the one or more processors may be configured to perform, at the UE, the conditional handover procedure to transfer from a source cell to the target cell.

Aspects generally include a method, apparatus, system, computer program product, non-transitory computer-readable medium, user equipment, base station, wireless communication device, source cell, target cell, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
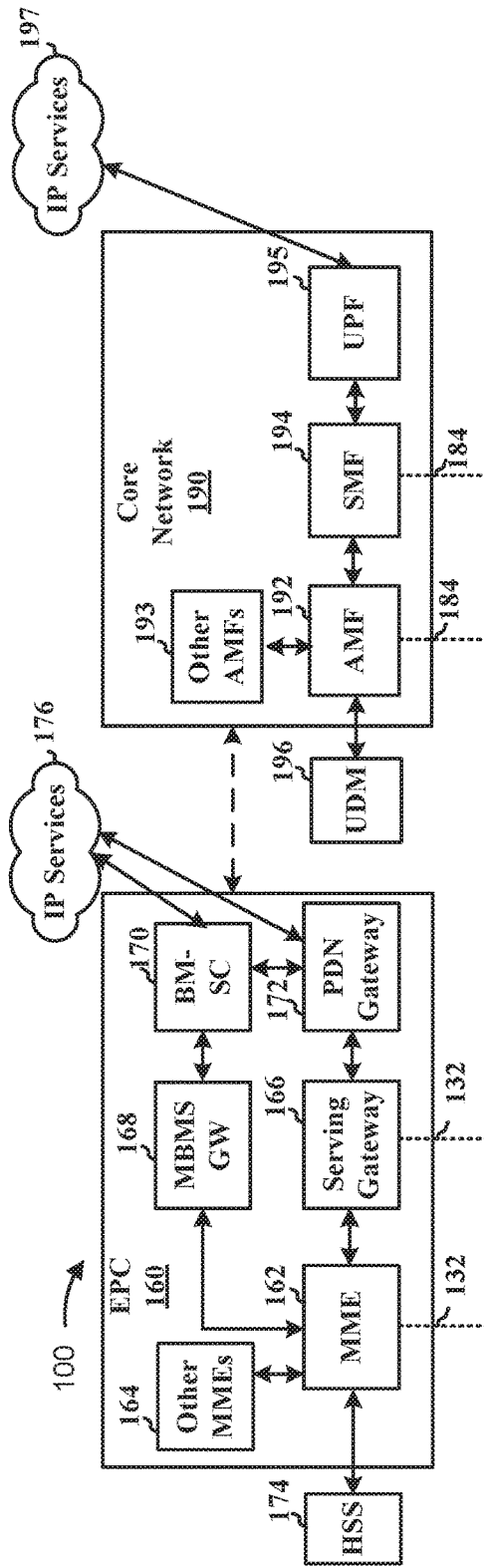
FIG. 1 is a block diagram conceptually illustrating an example of a wireless communication network, in accordance with various aspects of the present disclosure.
Figure 1:
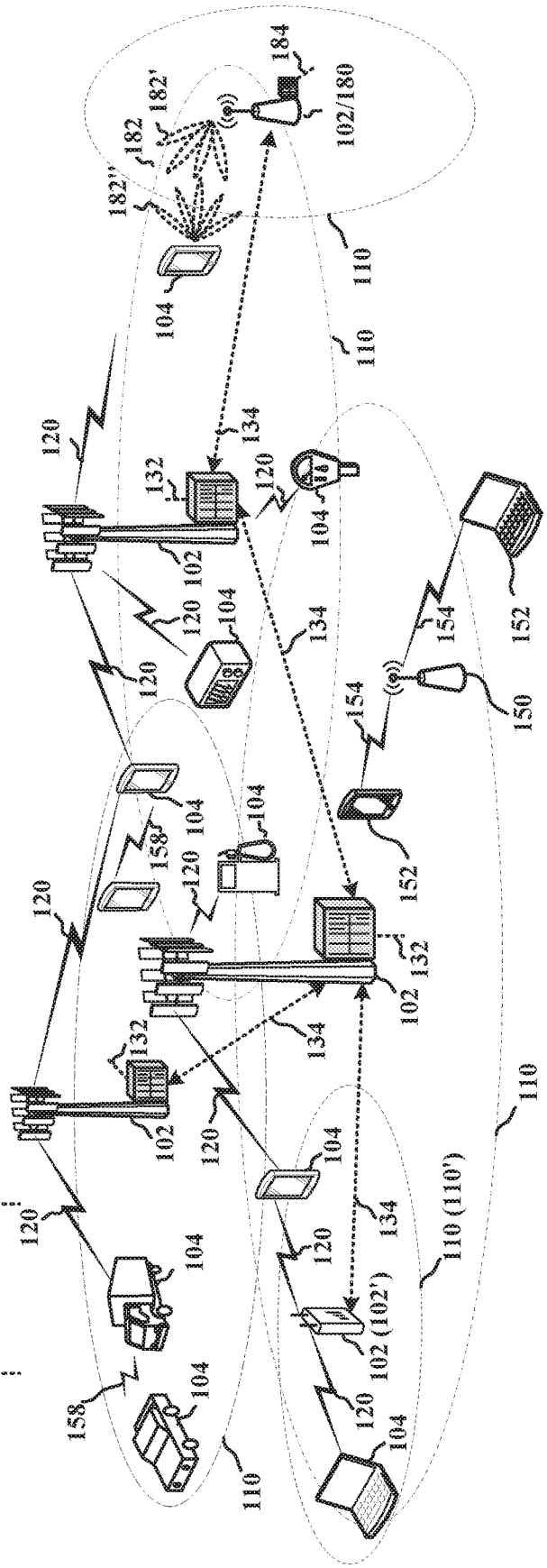

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., $S_1$ interface). The base stations 102 configured for 5G NR (collectively referred to as Next Generation RAN (NG-RAN)) may interface with 5GC 190 through backhaul links 184 (e.g., $N_2$ interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., $X_2$, Xn, and/or $N_2$ interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, BLUETOOTH, ZigBee, WI-FI based on the IEEE 802.11 standard, LTE, or NR.

The wireless communications system may further include a WI-FI access point (AP) 150 in communication with WI-FI stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the WI-FI AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

As indicated above, FIG. 1 is provided merely as an example. Other examples may differ from what was described with regard to FIG. 1.

Figure 2:
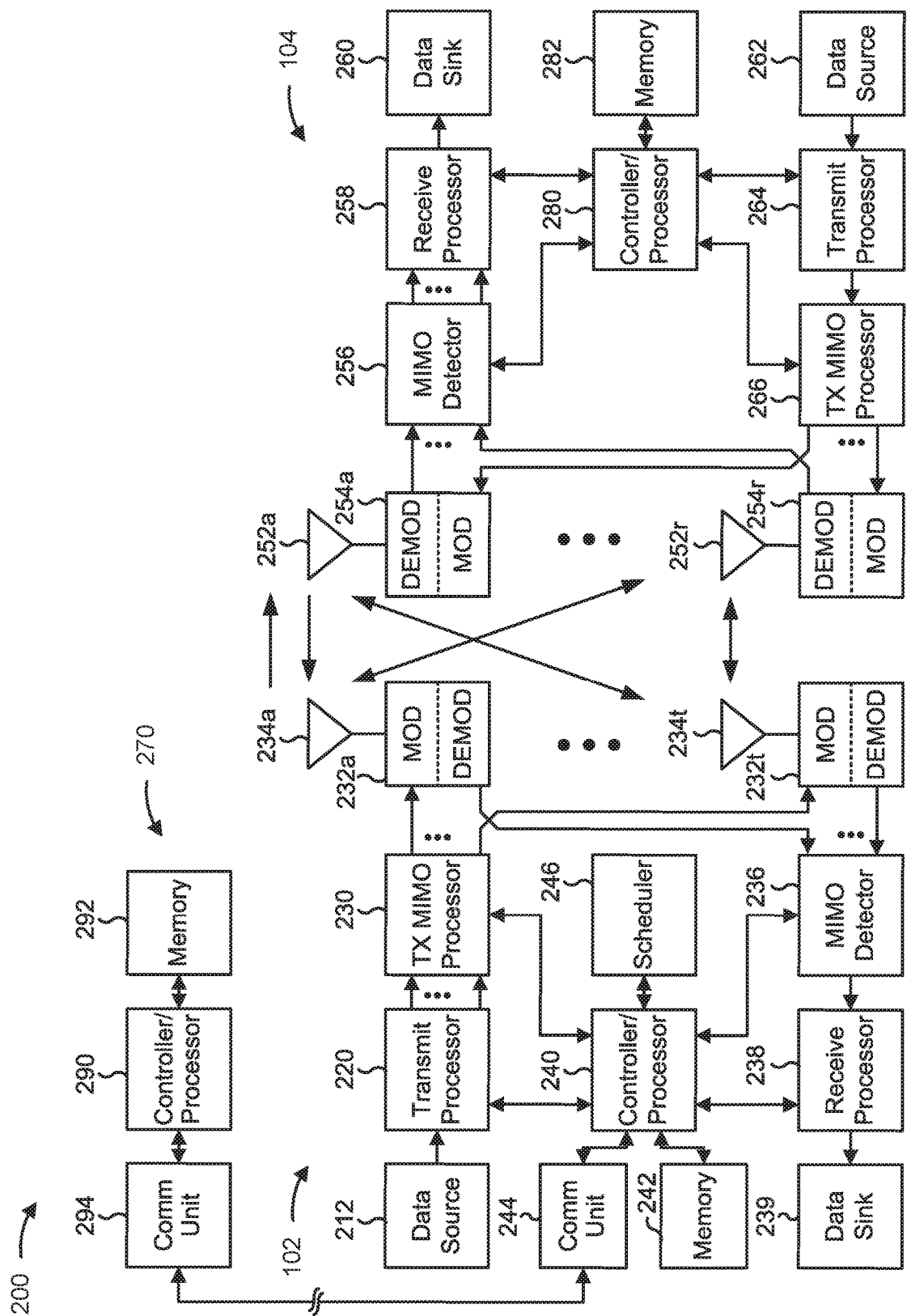
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 102 and UE 104, which may be one of the base stations and one of the UEs in FIG. 1. Base station 102 may be equipped with T antennas 234a through 234t, and UE 120 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 104, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 102. At base station 102, the uplink signals from UE 104 and other UEs may be received by antennas 234, processed by demodulators 232, detected by a MIMO detector 236 if applicable, and further processed by a receive processor 238 to obtain decoded data and control information sent by UE 104. Receive processor 238 may provide the decoded data to a data sink 239 and the decoded control information to controller/processor 240. Base station 102 may include communication unit 244 and communicate to a network controller 270 via communication unit 244. Network controller 270 may include communication unit 294, controller/processor 290, and memory 292.

Controller/processor 240 of base station 102, controller/processor 280 of UE 104, and/or any other component(s) of FIG. 2 may perform one or more techniques associated with cell and beam selection for a conditional handover procedure, as described in more detail elsewhere herein. For example, controller/processor 240 of base station 102, controller/processor 280 of UE 104, and/or any other component(s) of FIG. 2 may perform or direct operations of, for example, process 1000 of FIG. 10, process 1100 of FIG. 11, and/or other processes as described herein. Memories 242 and 282 may store data and program codes for base station 102 and UE 104, respectively. A scheduler 246 may schedule UEs for data transmission on the downlink and/or uplink.

In some aspects, base station 102 may include means for receiving a resource status request requesting load information related to load balancing between the wireless communication device and one or more other wireless communication devices, and means for transmitting a resource status response including the load information in response to the request. In some aspects, such means may include one or more components of base station 102 described in connection with FIG. 2.

In some aspects, UE 104 may include means for receiving a Radio Resource Control (RRC) configuration including a set of target cells for a conditional handover procedure and load information of the target cells, means for selecting a target cell from the set of target cells for the conditional handover procedure based at least on the load information of the target cells, and means for performing, at a User Equipment (UE), the conditional handover procedure to transfer from a source cell to the target cell. In some aspects, such means may include one or more components of UE 104 described in connection with FIG. 2.

As indicated above, FIG. 2 is provided merely as an example. Other examples may differ from what was described with regard to FIG. 2.

Figure 3A:
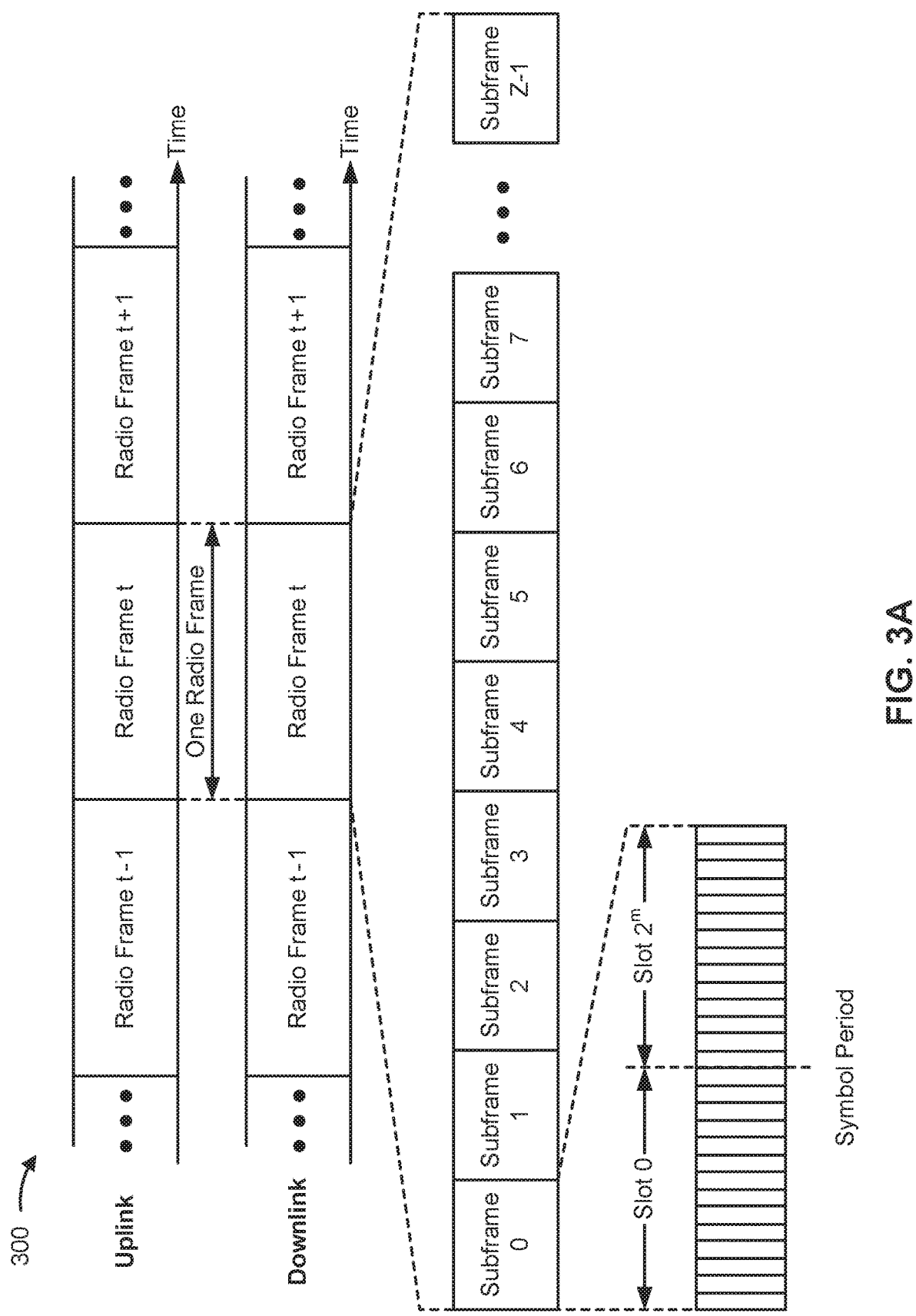
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
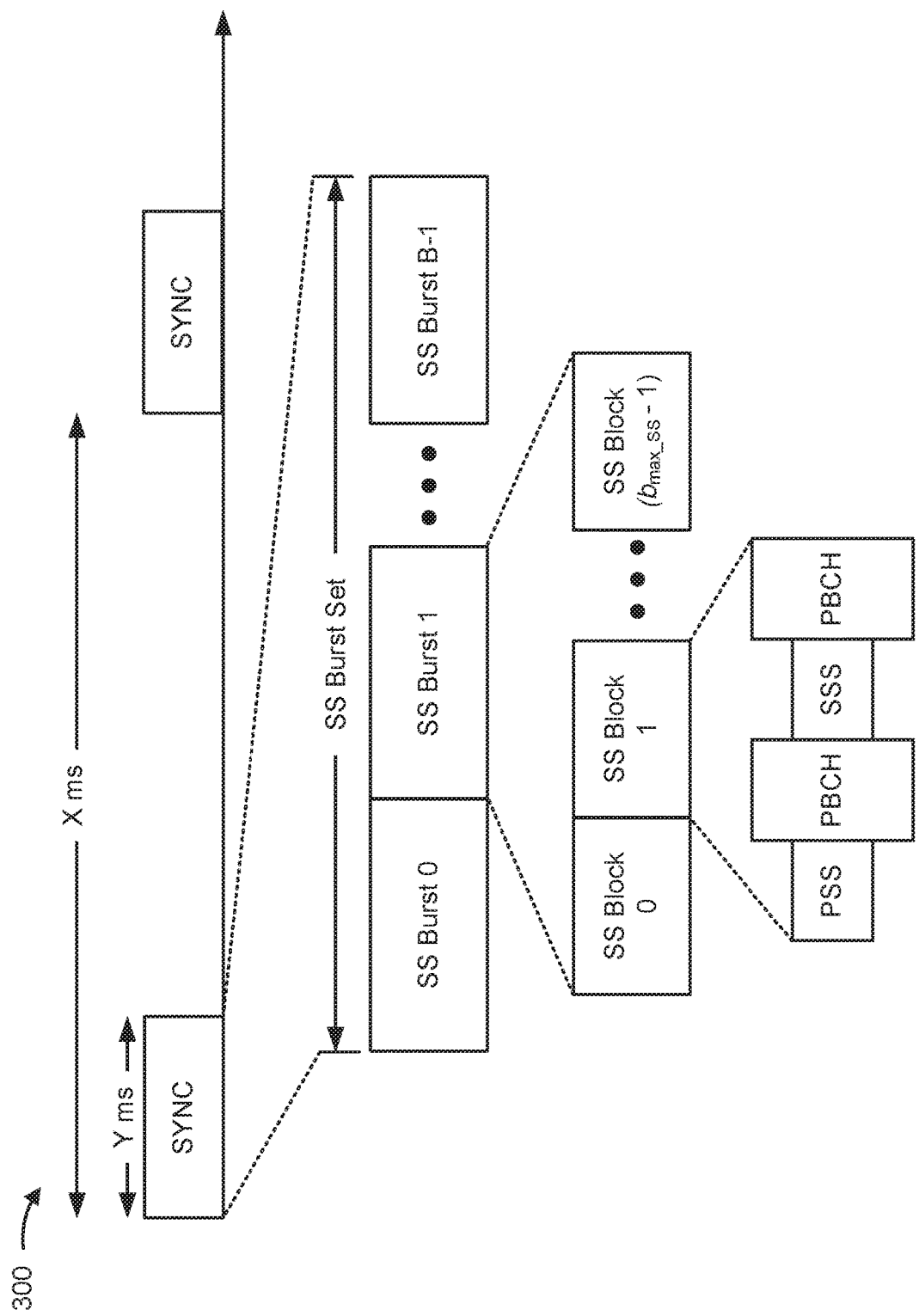
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B–1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be bfeam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIB s) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what was described with regard to FIGS. 3A and 3B.

Figure 4:
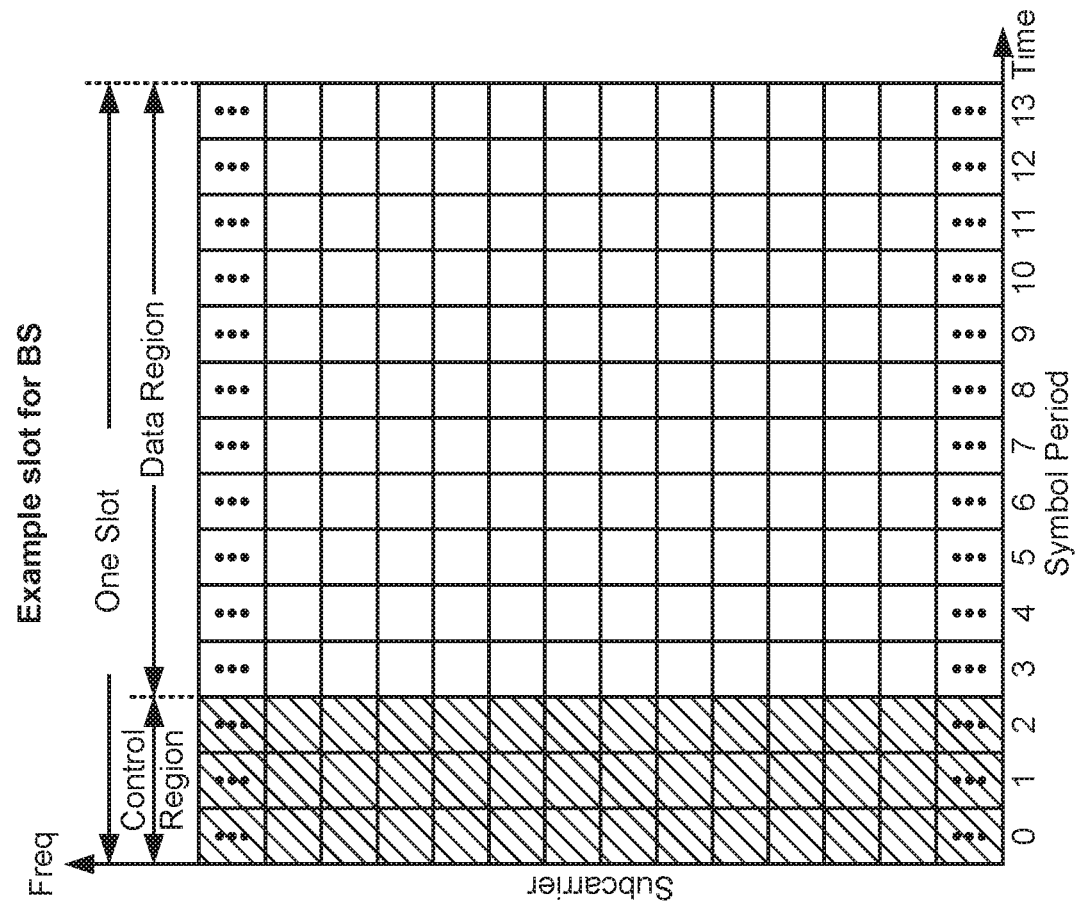
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q–1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what was described with regard to FIG. 4.

Figure 5:
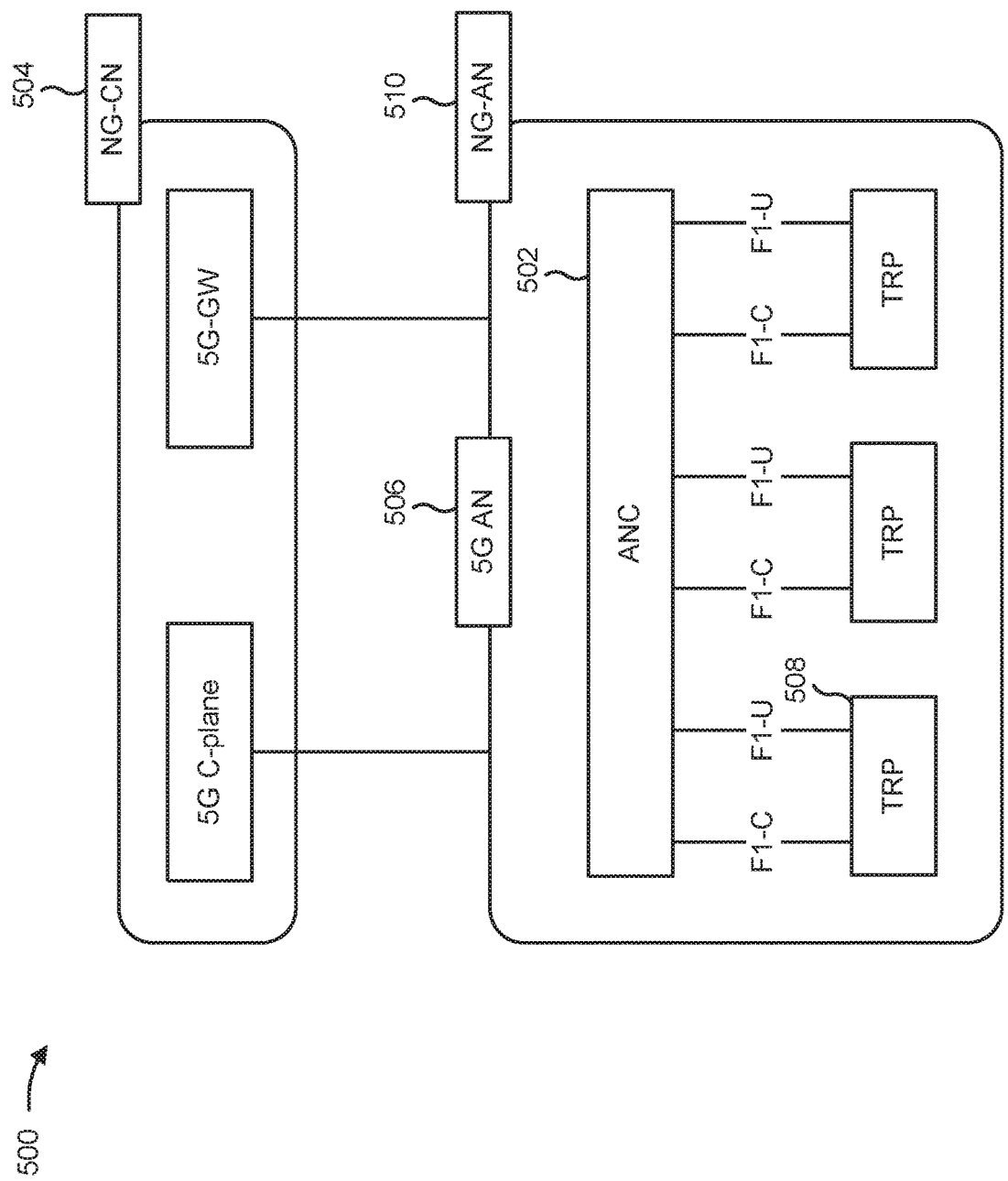
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The ANC may be communicate with one or more TRP's via $F_1$ interface. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated) via $F_1$ interface. For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what was described with regard to FIG. 5.

Figure 6:
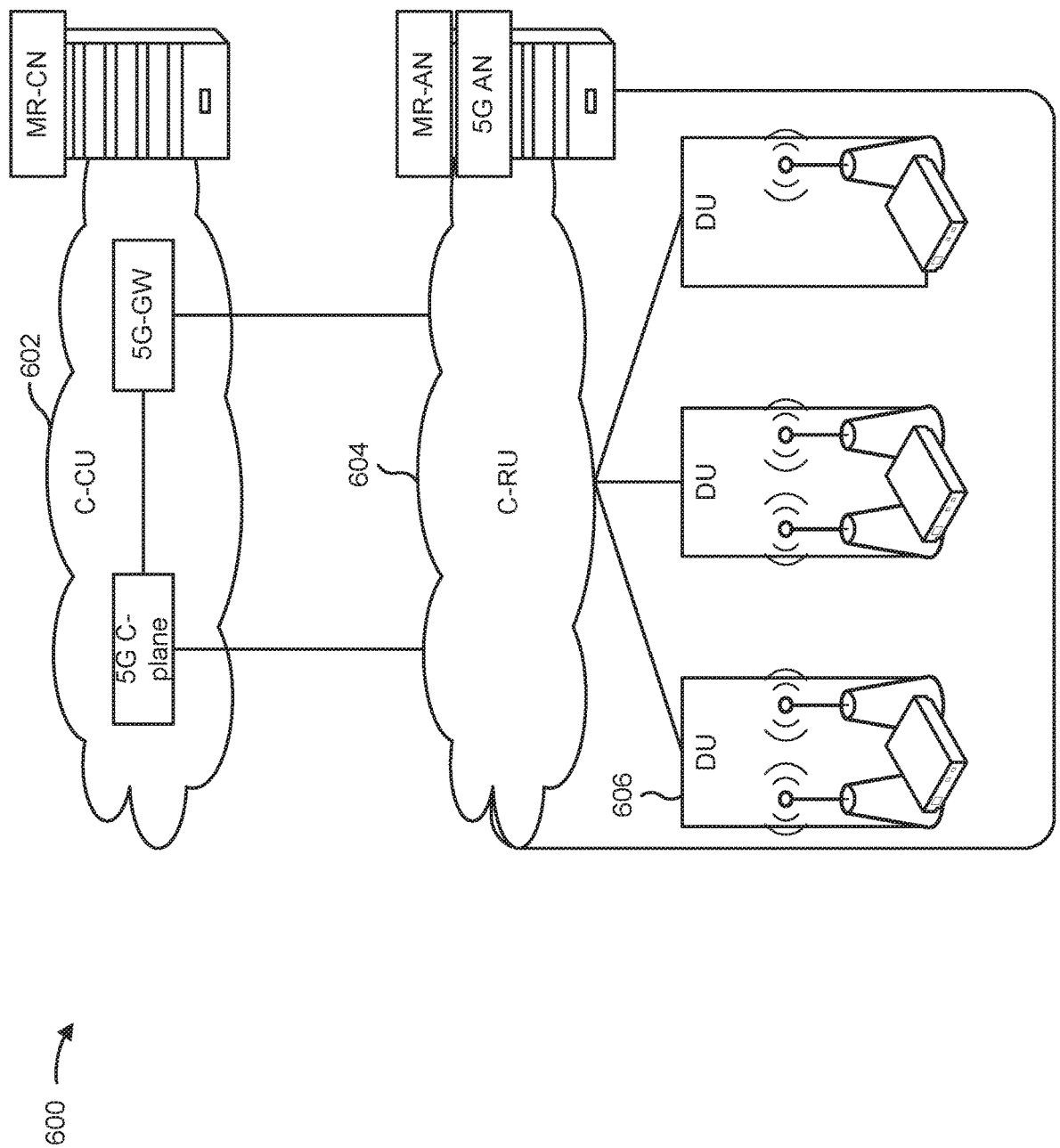
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what was described with regard to FIG. 6.

In some communication systems, such as 5G or NR, a mobility load balancing procedure may be performed to balance the load experienced by different base stations. For example, based on load information of different base stations, the base stations may perform one or more of handover procedures, cell reselection procedures, secondary node addition/modification procedures, bearer offloading procedures, and etc. to balance the load among the base stations. This may prevent one base station from being overloaded and may improve the overall operation efficiency of the wireless network.

To that end, base stations may monitor and collect load information and may communicate load information to other base stations. Load information may include radio resource usage information indicating usage rate and/or usage volume of different radio resources. For example, radio resource usage information may include information related to Guaranteed Bit Rate (GBR) Physical Resource Block (PRB) utilization and non-GBR PRB utilization. In a further example, radio resource usage information may include beam utilization information indicating utilization of different beams and corresponding directions. Beam utilization information may provide reference for beam access priority with regard to beam loading when performing Random Access Procedure (RACH) during a handover procedure.

Load information may include per service type radio resource usage information. For example, load information may include information on the usage of different types of services, such as enhanced Mobile Broadband (eMBB), Ultra Reliable Low Latency Communication (URLLC), enhanced Machine-Type Communication (eMTC), and etc. Per service type radio resource usage information may indicate an absolute value indicating an actual rate and/or volume of resource usage for a service type. In another example, the per service type radio resource usage information may indicate a relative value indicating a percentage of usage for a particular service type relative to other service types.

Different service types may have different requirements for radio resource. For example, eMBB may require more resource to handle large bandwidth transmission compared to URLLC. A node may reserve different amounts of resources based on different service types. As such, one certain service type may reach high loading status while another service type may still have loading room to accept incoming access.

Load information may include load per carrier information. Load per carrier information may indicate loading at different carriers. For example, for NR, Supplementary Uplink (SUL) may use lower-frequency carriers for uplink transmission in addition to dedicated uplink carrier. Load per carrier information may indicate load information at SUL carriers as wells as load information at dedicated carriers. SUL may generally be located at different frequency range from dedicated UL and may have different radio conditions. As such, for the same loading level, SUL and dedicated UL may have different loading room.

Load information also may include hardware load information. For example, hardware load information may include central unit (CU) hardware load information indicating loading at a CU. Hardware load information also may include per distributed unit (DU) hardware load information indicating loading at each DU. Different protocol layers of resources are utilized by CU and DU. For example, CU utilizes Packet Data Convergence Protocol (PDCP) and Radio Link Control (RLC) layer while DU utilizes resources in MAC and PHY layers. As such, CU and DU hardware load information may include usage information related to different layers of resources.

Load information may include Transport Network Layer (TNL) load information indicating loading experienced at different TNL's. For example, in NR, TNL load information may include load information for $N_2$ and/or $N_3$ TNL load, $F_1$ TNL load, and the like. CU utilizes $F_1$, $X_2$, Xn, $N_2$, $N_3$ TNL's while DU utilizes $F_1$ TNL. As such, CU And DU hardware load information may include load information related to different TNL's.

Load information further may include composite available capacity (CAC) information. Load information also may include a number of UE's in connected mode and/or a number of UE's in RRC_INACTIVE state. These numbers may be used for access control. For example, access may be restricted when a base station reaches a threshold number of UE's in connected mode and/or a threshold number of UE's in RRC_INACTIVE state. This may prevent a base station from being overloaded with too many UE's.

In NR, load information may be configured based on the CU-DU split feature. For example, CU load information may include CU hardware load, $F_1$, $X_2$, Xn, $N_2$, $N_3$ TNL load, composite available capacity, a number of UE's in connected mode, and a number of UE's in RRC_INACTIVE state. DU load information may include DU hardware load, radio resource usage information (e.g., GBR PRB/Non-GBR PRB utilization and beam utilization), per service type radio resource usage information, load per carrier information (e.g., SUL load), $F_1$ TNL load, and composite available capacity.

Various load information may be communicated and shared among different entities in a wireless network via different communication interfaces. In LTE, load information may be communicated among cells of interest via $X_2$ and/or $S_1$ communication procedures to balance load among base stations by adjusting handover and/or cell reselection parameters based on the load information.

In NR, load information may be communicated over Xn interface between NR base stations and/or between NR and enhanced LTE (eLTE) stations. The load information communicated via Xn interface may be used to implement handover procedures, cell reselection procedures, secondary node (SN) addition and/or modification procedures, and/or bearer offloading from SN procedures. In some aspects, load information may be communicated over $X_2$ interface between NR base stations and LTE base stations. The load information communicated via $X_2$ interface may be used to implement E-UTRA-NR Dual Connectivity (EN-DC) SN addition and/or modification procedures and bearer offloading procedures from Master Node (MN) to SN.

In some aspects, load information may be communicated over $F_1$ interface between CU's and DU's for load balancing among DU's. In some aspects, load information may be communicated over $N_2$ interface between base stations and a core network. The load information communicated via $N_2$ interface may be used to implement handover procedures and/or cell reselection procedures. In some aspects, load information may be communicated over Uu interface between base stations and UE's. The load information communicated via Uu interface may be used to implement conditional handover target cell selection.

Figure 7A:
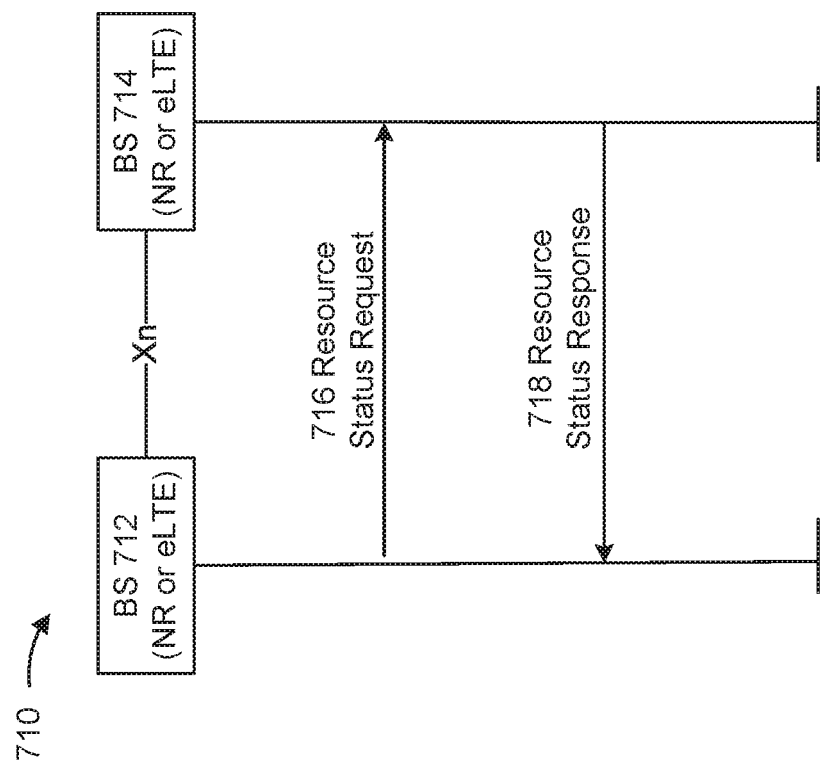
FIG. 7A is a diagram illustrating an example of load information communication via an Xn interface, in accordance with various aspects of the present disclosure.

FIG. 7A is a diagram illustrating an example 710 of load information communication via an Xn interface, in accordance with various aspects of the present disclosure. As shown in FIG. 7A, base station 712 and base station 714 may communicate via an Xn interface. Base stations 712 and 714 may be examples of base stations 102, as described in FIGS. 1 and 2. Each of base stations 712 and 714 may be an NR base station or an eLTE base station. Base station 712 may send a resource status request 716 to base station 714 via the Xn interface. The resource status request 716 may include request for measurements of load information. The requested load information may include radio resource usage information, such as GBR PRB/Non-GBR PRB utilization information and/or beam utilization information, per service type radio resource usage information, load per carrier information including SUL load, hardware load information including CU and per DU hardware load, TNL load information including $N_2$, $N_3$, and/or $F_1$ TNL load, composite available capacity, numbers of UE's in connected mode, and/or numbers of UE's in RRC_INACTIVE state.

Base station 714 may receive the resource status request 716 and may monitor communication status and determine load information based on the resource status request. For example, base station 714 may determine the current load conditions at different radio resources, different beams, different service types, different carriers, CU and per DU's, different TNL's, and the like. Base station 714 may then generate a resource status response 718 including the requested load information and may send the resource status response 718 back to base station 712. Base station 712 may use the load information to perform various load balancing procedures. For example, base station 712 may adjust parameters for handover procedures, cell reselection procedures, SN addition/modification procedures, and/or bearer offloading procedures, based on the load information received from base station 714. Thus, load balancing may be implemented between base stations 712 and 714. This may prevent one base station from being overloaded and may improve the overall operating efficiency of the wireless network.

Figure 7B:
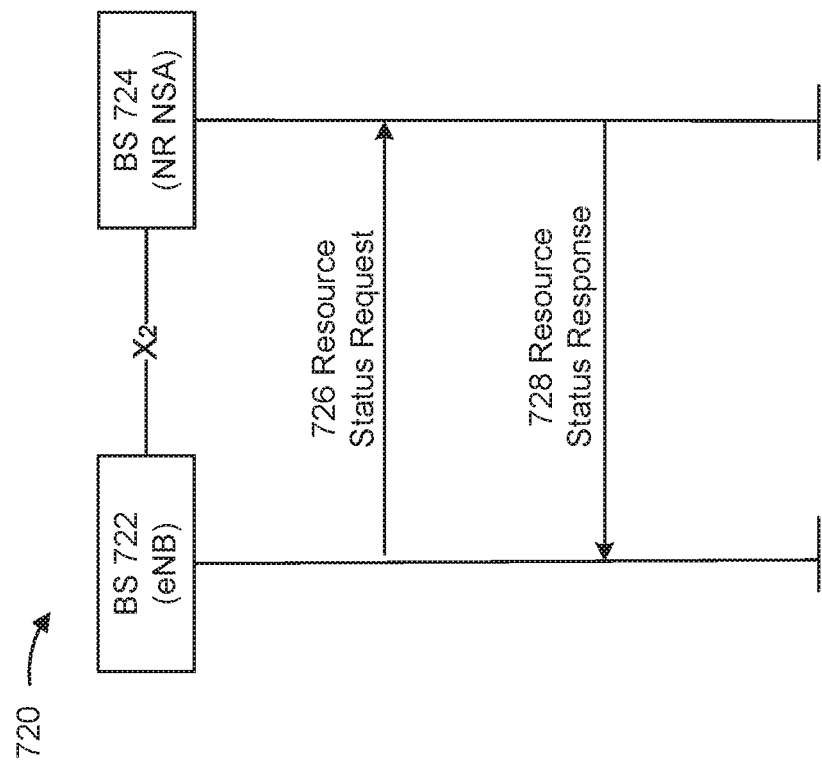
FIG. 7B is a diagram illustrating an example of load information communication via an $X_2$ interface, in accordance with various aspects of the present disclosure.

FIG. 7B is a diagram illustrating an example 720 of load information communication via an $X_2$ interface, in accordance with various aspects of the present disclosure. As shown in FIG. 7B, base station 722 and base station 724 may communicate via an $X_2$ interface. Base stations 722 and 724 may be examples of base stations 102, as described in FIGS. 1 and 2. One of base stations 722 and 724 may be an eNB base station and the other of base stations 722 and 724 may be a NR base station (e.g., non-standalone type). Base station 722 may send a resource status request 726 to base station 724 via the $X_2$ interface. The resource status request 726 may include request for measurements of load information. The requested load information may include radio resource usage information, such as GBR PRB/Non-GBR PRB utilization information and/or beam utilization information, per service type radio resource usage information, load per carrier information including SUL load, hardware load information including CU and per DU hardware load, TNL load information including $N_2$, $N_3$, and/or $F_1$ TNL load, composite available capacity, numbers of UE's in connected mode, and/or numbers of UE's in RRC_INACTIVE state.

Base station 724 may receive the resource status request 726 and may monitor and determine load information based on the resource status request. For example, base station 724 may determine the current load conditions at different radio resources, different beams, different service types, different carriers, CU and per DU, different TNL's, and the like. Base station 724 may then generate a resource status response 728 including the requested load information and may send the resource status response 728 back to base station 722. Base station 722 may use the load information to perform various load balancing procedures. For example, base station 722 may adjust parameters for SN addition/modification procedures, and/or bearer offloading procedures, based on the load information received from base station 724. Thus, load balancing may be implemented between a master node and a secondary node, such as base stations 722 and 724. This may prevent a master node or a secondary node from being overloaded and may improve the overall operating efficiency of the wireless network.

Figure 7C:
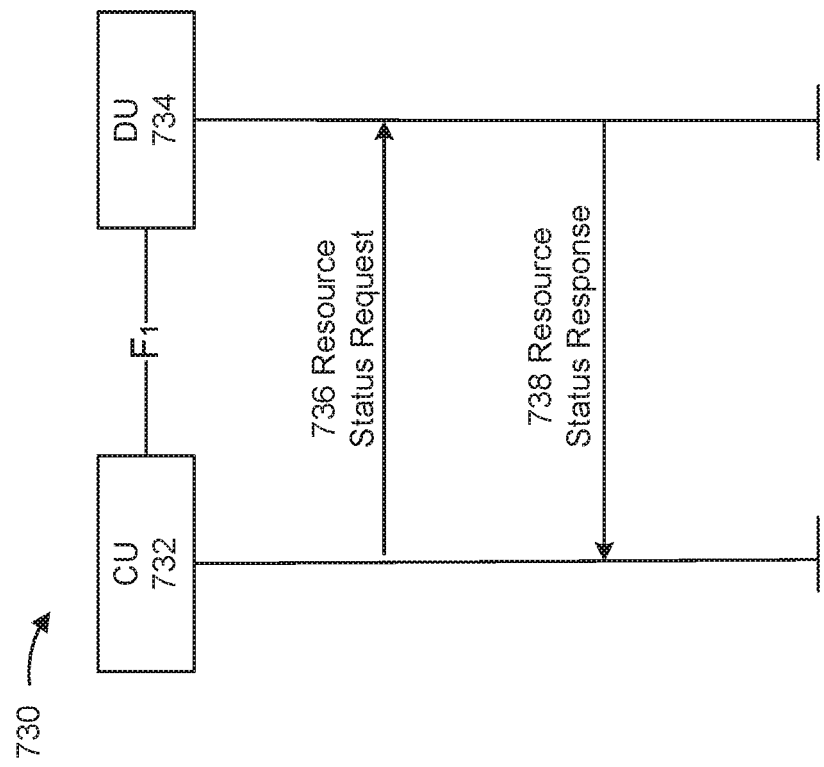
FIG. 7C is a diagram illustrating an example of load information communication via an $F_1$ interface, in accordance with various aspects of the present disclosure.

FIG. 7C is a diagram illustrating an example 730 of load information communication via an $F_1$ interface, in accordance with various aspects of the present disclosure. As shown in FIG. 7C, a central unit (CU) 732 and a distributed unit (DU) 734 may communicate via an $F_1$ interface. CU 732 and DU 734 may be examples of CU's and DU's, as described in FIGS. 5 and 6. CU 732 may send a resource status request 736 to one or more DU's 734 via the $F_1$ interface. The resource status request 736 may include request for measurements of load information. The requested load information may include DU load information, such as DU hardware load, radio resource usage information, such as GBR PRB/Non-GBR PRB utilization information and/or beam utilization information, per service type radio resource usage information, load per carrier information including SUL load, $F_1$ TNL load, and composite available capacity, and the like.

DU 734 may receive the resource status request 736 and may monitor and determine load information based on the resource status request 736. For example, DU 734 may determine the current load conditions at hardware level, F1 interface, at different radio resources, different beams, different service types, different carriers, and the like. The one or more DU's 734 may then generate resource status response(s) 738 including the requested load information and may send the resource status response 738 back to CU 732 via the $F_1$ interface. CU 732 may use the DU load information to perform various load balancing procedures among the DU's 734. For example, CU 732 may assign additional UE's to respective DU's 734 based on DU's 734 load information. DU's with less load may be assigned more UE's while DU's with more load may be assigned less UE's. This may prevent a DU 734 from being overloaded and may improve the overall operating efficiency of the wireless network.

In some aspects, DU's 734 may request and receive CU load information from CU 732 via the interface $F_1$. CU load information may include CU hardware load, $F_1$, $X_2$, Xn, $N_2$, $N_3$ TNL load, composite available capacity, a number of UE's in connected mode, and a number of UE's in RRC_INACTIVE state. The DU's 732 may be informed of the load conditions at CU 732 for load balancing purposes.

Figure 7D:
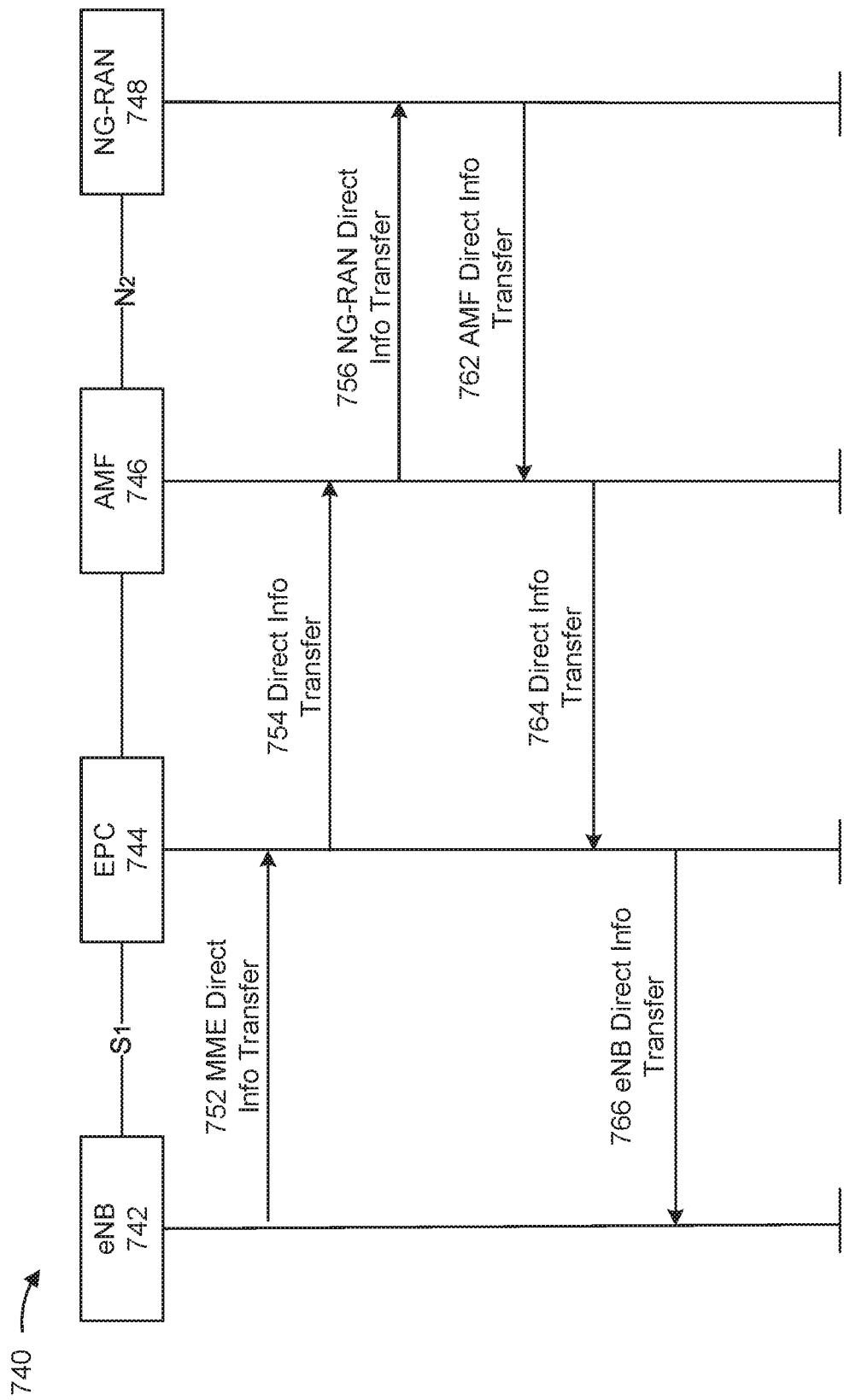
FIG. 7D is a diagram illustrating an example of load information communication via an Xn interface and/or an $N_2$ interface through a core network, in accordance with various aspects of the present disclosure.

FIG. 7D is a diagram illustrating an example 740 of load information communication via an Xn interface and/or an $N_2$ interface through a core network, in accordance with various aspects of the present disclosure. As shown in FIG. 7D, an eNB base station 742 may communicate with an evolved packet core (EPC) 744 via an $S_1$ interface. A NG-RAN base station 748 may communicate with an Access and Mobility Management Function (AMF) 746 via an $N_2$ interface. eNB base station 742 and NG-RAN base station 748 may communicate load information via the core network.

eNB base station 742 may initiate a request measurement by sending a resource status request in the form of an MME direct information transfer 752 via the $S_1$ interface to EPC 744. EPC 744 may forward the resource status request in the form of a direct information transfer 754 to AMF 746. AMF 746 may send the resource status request in the form of an NG-RAN direct information transfer 756 to NG-RAN base station 748 via the $N_2$ interface. The resource status request may include request for measurements of load information. The requested load information may include radio resource usage information, such as GBR PRB/Non-GBR PRB utilization information and/or beam utilization information, per service type radio resource usage information, load per carrier information including SUL load, hardware load information including CU and per DU hardware load, TNL load information including N2, N3, and/or F1 TNL load, composite available capacity, numbers of UE's in connected mode, and/or numbers of UE's in RRC_INACTIVE state.

NG-RAN base station 748 may receive the resource status request and may monitor and determine load information based on the resource status request. For example, NG-RAN base station 748 may determine the current load conditions at different radio resources, different beams, different service types, different carriers, CU and per DU, different TNL's, and the like. NG-RAN base station 748 may then generate a resource status response including the requested load information and may send the resource status response in the form of an AMF Direct Information Transfer 762 back to AMF 746. AMF 746 may send the resource status response in the form of a direct information transfer to EPC 744. EPC 744 may send the resource status response in the form of an eNB direct information transfer 766 back to eNB base station 742.

eNB base station 742 may use the load information to perform various load balancing procedures. For example, base station 742 may adjust parameters for handover procedures and/or cell reselection procedures, based on the load information received from NG-RAN base station 748. Thus, load balancing may be implemented between an eNB base station and an NG-RAN base station, such as base stations 742 and 748. This may prevent load imbalance between an eNB base station and an NG-RAN base station and may improve the overall operating efficiency of the wireless network.

In some aspects, NG-RAN 748 may initiate a resource status request to request load information from eNB base station 742 via the core network. In this case, the communication process may be similar, but reversed, as the resource status request may begin from NG-RAN 748 through the core network to reach eNB base station 742 and eNB base station 742 may send back resource status response including load information of eNB base station 742 back to NG-RAN 748 through the core network.

Conditional handover procedure may be used for improved mobility robustness relative to other techniques. For example, by implementing a conditional handover procedure, a network may reduce a likelihood of radio link failure for a UE and a BS in a scenario where a quality of a link between the UE and the BS degrades too quickly to apply a forward handover procedure. In a conditional handover procedure, the BS may proactively provide a conditional handover configuration to the UE. For example, the BS may provide the conditional handover configuration before a handover triggering event. In this case, the conditional handover configuration may include a configuration of a candidate target cell, an indication of a condition to trigger the conditional handover procedure, and/or the like. When the condition to trigger the conditional handover procedure is satisfied, the UE may initiate a random access channel procedure to transfer to a target cell. In this way, a handover delay is reduced relative to a forward handover procedure, where a UE may send a measurement report and/or receive a radio resource control (RRC) configuration message before performing the forward handover procedure.

Figure 8A:
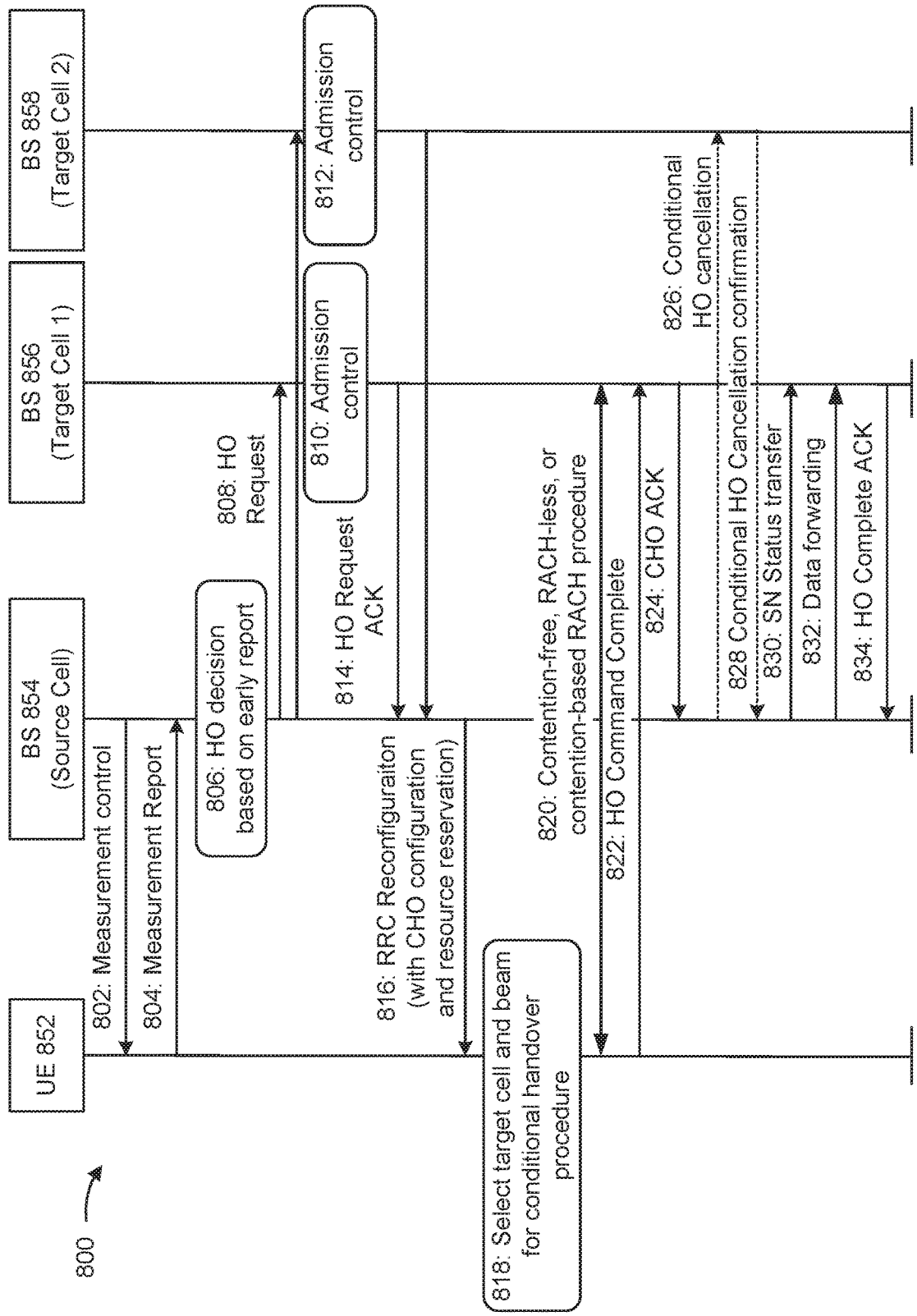
FIG. 8A is a diagram illustrating an example of cell and beam selection for a conditional handover procedure, in accordance with various aspects of the present disclosure.

FIG. 8A is a diagram illustrating an example 800 of cell and beam selection for a conditional handover procedure, in accordance with various aspects of the present disclosure. As shown in FIG. 8A, example 800 may include a UE 852 and a set of BSs 854, 856, and 858. For example, BS 854 may be a source cell, BS 856 may be a first target cell, and BS 858 may be a second target cell.

As further shown in FIG. 8A, and by reference numbers 802 and 804, UE 852 may receive a measurement control message from the source cell, and may provide a measurement report to the source cell. For example, the source cell may provide a signal to UE 852 to enable UE 852 to measure a signal strength of the signal and report the signal strength of the signal. In some aspects, the measurement control message may include information identifying a configuration for UE 852. For example, the source cell may indicate which parameter UE 852 is to determine, such as a signal strength parameter (e.g., a reference signal received power (RSRP)), a signal quality parameter (e.g., a reference signal received quality (RSRQ)), and or the like. In this case, UE 852 may report that the parameter does not satisfy a threshold, which may trigger the source cell to determine an availability of the target cells for a handover. In some aspects, the source cell may provide information identifying the threshold. In some aspects, UE 852 may obtain stored information identifying the threshold.

As further shown in FIG. 8A, and by reference number 806, the source cell may make a handover decision based at least in part on the measurement report. For example, the source cell may determine, based at least in part on the measurement report, that a condition for performing a conditional handover is satisfied. In this case, the source cell may determine that UE 852 is to be handed over from the source cell to a target cell. In some aspects, the source cell may determine that a condition for performing a conditional handover is satisfied based at least in part on a signal quality of a link between UE 852 and the source cell not satisfying a threshold. Additionally, or alternatively, the source cell may determine that the condition for performing the conditional handover is satisfied based at least in part on a beam quality of a beam used by UE 852 and/or the source cell not satisfying a threshold.

As further shown in FIG. 8A, and by reference numbers 808, 810, 812, and 814, the source cell may provide a handover request to the first target cell and/or the second target cell, and may receive a handover request acknowledgement. For example, the source cell may provide the handover request to the first target cell and the second target cell, which may be candidate target cells, and the first target cell and the second target cell may perform an admission control procedure. In this case, the first target cell and the second target cell may determine whether UE 852 may be connected to the first target cell and the second target cell, respectively (e.g., based at least in part on a cell congestion, a cell status, and/or the like). Based at least in part on performing admission control, the first target cell and the second target cell may provide an acknowledgement to the source cell to indicate that UE 852 may transfer to the first target cell and/or the second target cell.

As further shown in FIG. 8A, and by reference number 816, the source cell may provide, to UE 852, a radio resource control (RRC) reconfiguration message with a conditional handover configuration and a resource reservation configuration. For example, the source cell may provide the RRC reconfiguration message to identify a configuration for a conditional handover, to alter a configuration for the conditional handover, and/or the like. In some aspects, the source cell may provide the RRC reconfiguration message to identify a set of candidate target cells (e.g., the first target cell, the second target cell, and/or the like), a conditional handover condition (e.g., a threshold cell quality for selecting a target cell and determining to transfer to the target cell), and/or the like. In some aspects, the source cell may identify an offset value. For example, the source cell may identify an event trigger configuration offset value that indicates an offset to be applied to a threshold corresponding to a measurement event that triggers a measurement report. In some aspects, the source cell may identify a priority of a candidate target cell. For example, the source cell may identify a plurality of priorities of a plurality of candidate target cells to enable UE 852 to determine which candidate target cell, of the plurality of candidate target cells, to which to transfer when performing a conditional handover.

In some aspects, the source cell may provide the RRC reconfiguration message to convey a measurement identifier. A measurement identifier may identify a measurement configuration that links a measurement object and a reporting configuration. In this case, UE 852 may use the measurement identifier to determine which object is to be measured (e.g., which parameter), and which threshold triggers reporting of a measurement of the object. In this way, the source cell may update conditions associated with performing a conditional handover. For example, the source cell may include an information element identifying a threshold criterion for handing over from the source cell to a candidate target cell, and UE 852 may use the threshold criterion to select a candidate target cell and a beam. In some aspects, UE 852 may determine, based at least in part on the information element, a candidate cell threshold offset, a handover priority identifier, and/or the like.

In some aspects, the source cell may indicate, to UE 852, that a conditional handover is to be triggered based at least in part on a quality of a beam identified in a random access channel configuration. For example, the source cell may include information identifying a candidate target cell identifier, a beam threshold offset, a handover priority indicator, and/or the like. Additionally, or alternatively, the source cell may indicate that the conditional handover is to be triggered based at least in part on a quality of a beam identified in a conditional handover condition identifier. In this case, the source cell may include information identifying a candidate cell identifier, a beam list (e.g., a channel state information reference signal (CSI-RS), a synchronization signal block (SSB), and/or the like), a beam threshold, a handover priority indicator, and/or the like.

As further shown in FIG. 8A, and by reference number 818, UE 852 may select a target cell, of a plurality of candidate target cells, and a beam for a conditional handover procedure. For example, UE 852 may evaluate the plurality of candidate target cells to determine whether at least one candidate target cell satisfies a condition for performing a conditional handover to the at least one candidate target cell. In this case, the condition may relate to a candidate target cell having a cell quality metric that satisfies a threshold, a beam quality metric that satisfies a threshold, and/or the like, as described herein. Based at least in part on evaluating the plurality of candidate target cells, UE 852 may select a beam associated with the first target cell, a beam associated with the second target cell, and/or the like.

In some aspects, UE 852 may perform cell selection, and then may subsequently perform beam selection. For example, UE 852 may select a target cell from a plurality of candidate target cells configured based at least in part on the RRC reconfiguration message from the source cell. In this case, UE 852 may subsequently select a beam, from a group of one or more beams of a selected target cell, to perform a random access channel procedure to transfer to the selected target cell. For example, UE 852 may select the beam based at least in part on a beam list received from the source cell that identifies the one or more beams of the selected target cell. In some aspects, UE 852 may select a beam based at least in part on a threshold. For example, UE 852 may determine that a particular beam satisfies a threshold beam quality, and may select the particular beam. In contrast, if no beams satisfy the threshold beam quality, UE 852 may fall back to a contention based random access (CBRA) procedure, and may select any beam of the selected target cell based at least in part on falling back to the CBRA procedure. In some aspects, UE 852 may perform cell selection and beam selection concurrently for a conditional handover. For example, UE 852 may process information relating to both a target cell and a beam associated therewith to perform cell selection and beam selection.

In some aspects, UE 852 may determine a cell quality, and may select a target cell and/or a beam based at least in part on the cell quality. For example, when candidate target cells are each associated with a single beam, UE 852 may determine that a single candidate target cell is associated with a cell quality satisfying a threshold, and may select the single candidate target cell as the target cell. Additionally, or alternatively, when UE 852 determines that a plurality of candidate target cells are associated with cell qualities that satisfy a threshold, UE 852 may select a particular candidate target cell associated with a best cell quality relative to other candidate target cells. Additionally, or alternatively, UE 852 may select the target cell based at least in part on an index value. For example, UE 852 may select a first candidate target cell with a cell quality that satisfies a threshold. In this case, the first candidate target cell may be sequentially first with respect to a cell index, a frequency index, an identified order in a cell list, and/or the like. Additionally, or alternatively, UE 852 may select the target cell based at least in part on a prioritization. For example, UE 852 may select a candidate target cell, which has a cell quality that satisfies a threshold, associated with a highest priority relative to other candidate target cells with cell qualities satisfying the threshold.

In some aspects, UE 852 may select a target cell based at least in part on a comparison of a plurality of beams of different candidate target cells. For example, when UE 852 is configured with a plurality of beams for each candidate target cell, UE 852 may compare a best beam with respect to a beam quality metric to select a candidate target cell as a target cell. In this case, UE 852 may select a candidate target cell based at least in part on a best beam of the candidate target cell (e.g., a beam with a highest beam quality metric of beams of the candidate target cell) having a higher beam quality metric than other best beams of other candidate target cells. Additionally, or alternatively, UE 852 may select a first candidate target cell that has a best beam, with respect to a beam quality metric, that satisfies a threshold for beam quality. Additionally, or alternatively, UE 852 may select a candidate target cell with a highest priority among candidate target cells whose best beam, with respect to a beam quality metric, satisfies a threshold for the beam quality metric.

In some aspects, UE 852 may select a beam of a plurality of beams of a plurality of candidate target cells. For example, when UE 852 is configured with a plurality of beams for each candidate target cell, UE 852 may perform beam selection for all beams of all candidate target cells. In this case, UE 852 may select a beam with a highest beam quality metric, a sequentially first beam (e.g., with respect to an index value) that satisfies a beam quality threshold, a beam associated with a highest priority for an associated cell, and/or the like.

In some aspects, UE 852 may select a beam based at least in part on an averaging procedure. For example, UE 852 may determine a beam set quality for each candidate target cell based at least in part on a plurality of beam qualities of a plurality of beams of respective candidate target cells, and may select a candidate target cell based at least in part on a corresponding beam set quality. In some aspects, UE 852 may select a candidate target cell with a highest beam set quality relative to other candidate target cells. Additionally, or alternatively, UE 852 may select a sequentially first candidate target cell, with respect to an index value, that has a beam set quality that satisfies a threshold. Additionally, or alternatively, UE 852 may select a candidate target cell, which has a beam set quality that satisfies a threshold, that has a highest priority relative to other candidate target cells. In some aspects, UE 852 may report an event triggering a handover to the source cell. For example, UE 852 may report one or more measurements associated with a cell quality when the cell quality triggers the handover.

In some aspects, UE 852 may perform cell selection and/or beam selection based on load information associated with the respective target cells and respective beams. For example, load information may be incorporated into the parameters for selecting cell and/or selecting beams, such that cells or beams that have more load may have a lower likelihood of being selected. This may prevent cells or beams that have relatively high load from being overloaded and allow cells or beams that have relatively low load to be selected and utilized.

As further shown in FIG. 8A, and by reference number 820, based at least in part on selecting, for example, the first target cell as the target cell for the conditional handover procedure, UE 852 may communicate with the first target cell to transfer to the first target cell. For example, UE 852 may exchange a set of messages with the first target cell in accordance with an access procedure to connect to the first target cell. In some aspects, the access procedure may be a contention-free access procedure, a random access channel (RACH)-less access procedure, a contention-based RACH procedure, and/or the like. In this way, UE 852 determines whether UE 852 is able to access the first target cell to hand over to the first target cell in a conditional handover scenario.

As further shown in FIG. 8A, and by reference numbers 822 and 824, UE 852 may provide an indication to the first target cell that a handover command is complete and may trigger a response message based at least in part on performing the conditional handover procedure. For example, based at least in part on performing the access procedure, UE 852 may indicate that UE 852 is connecting to the first target cell, and not abandoning a connection to the first target cell to remain on the source cell. In this case, the first target cell may provide, to the source cell, an acknowledgement message acknowledging that UE 852 is connecting to the first target cell (shown as a "CHO ACK"). In this way, the first target cell enables the source cell to begin transfer of information to the first target cell, which may enable the first target cell to become a serving cell for UE 852.

As further shown in FIG. 8A, and by reference numbers 826 and 828, in some aspects, the source cell may provide a conditional handover cancellation message to the second target cell, and may receive a response message. For example, the source cell may provide the conditional handover cancellation message to indicate that UE 852 is not transferring to the second target cell (e.g., based at least in part on receiving the acknowledgement message acknowledging that UE 852 is successfully connected to the first target cell). In this case, the source cell causes an end to the admission control procedure of the second target cell.

As further shown in FIG. 8A, and by reference numbers 830 and 832, the source cell may provide a sequence number status transfer message to the first target cell and may perform data forwarding to the first target cell. For example, based at least in part on receiving the acknowledgement message acknowledging that UE 852 is connecting to the first target cell, the source cell may provide the sequence number status, and may forward data for UE 852 to the first target cell to enable a handover to the first target cell and avoid data being dropped from transmission to UE 852.

As further shown in FIG. 8A, and by reference number 834, the first target cell may provide an acknowledgement message indicating that the conditional handover procedure is complete. For example, the first target cell may indicate to the source cell that the conditional handover procedure is complete, and that the source cell may cease data forwarding, release information relating to UE 852 (e.g., a UE context), and/or the like.

As indicated above, FIG. 8A is provided as an example. Other examples may differ from what was described with respect to FIG. 8A.

Figure 8B:
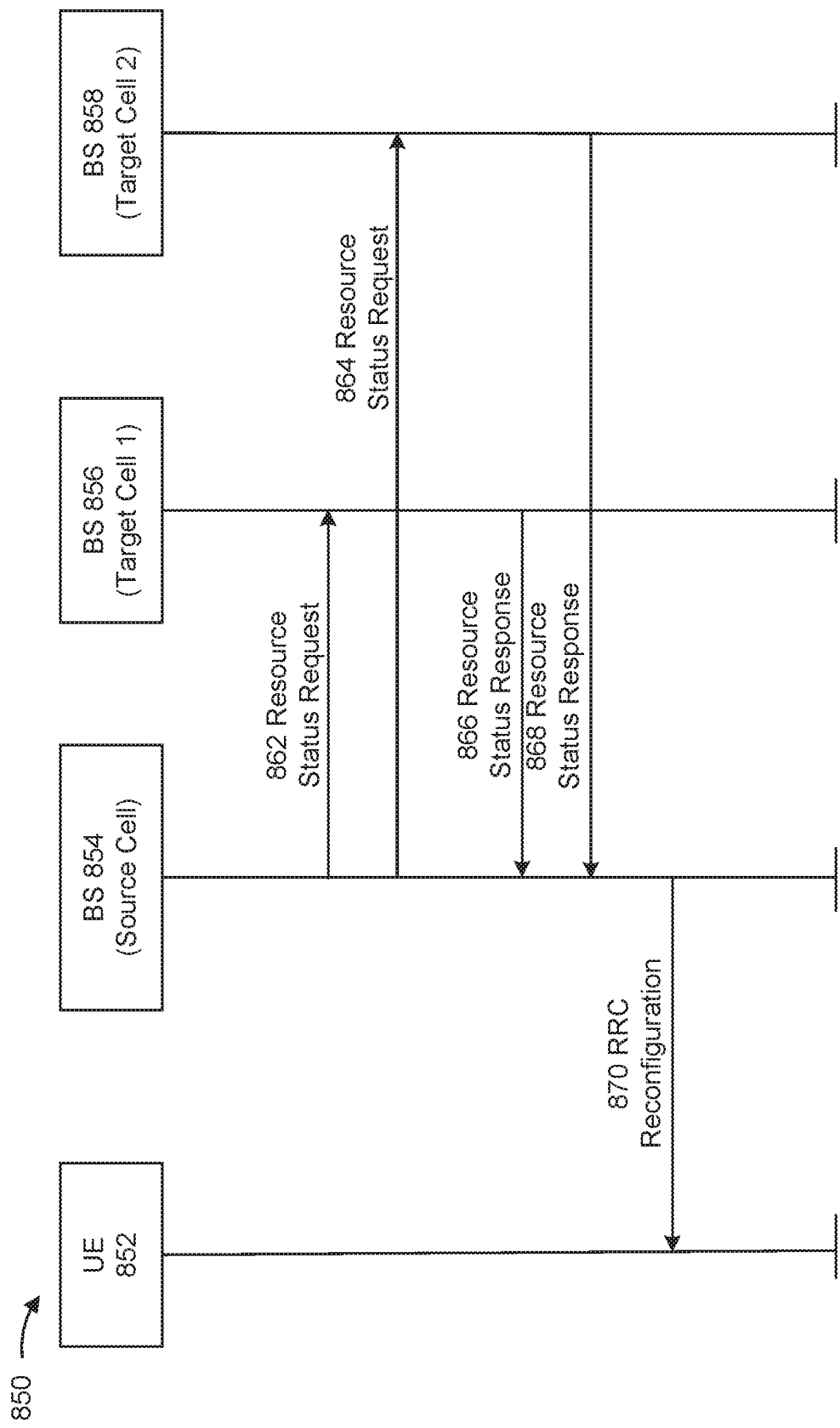
FIG. 8B is a diagram illustrating an example of load information communication for a conditional handover procedure, in accordance with various aspects of the present disclosure.

FIG. 8B is a diagram illustrating an example 850 of load information communication for a conditional handover procedure, in accordance with various aspects of the present disclosure. As noted above, the source cell may collect load information from target cells 1 and 2 and may communicate the load information to the UE. As such, the UE may perform cell selection and/or beam selection based on the load information of target cells 1 and 2. The load information communication procedure may be performed before and/or during the conditional handover procedure.

As shown in FIG. 8B, the source cell may initiate and communicate a resource status request 862 to the target cell1 and the target cell 2. The resource status request 862 may include request for load information respectively from target cell 1 and target cell 2. In particular, the load information requested may include radio resource usage information, such as GBR PRB and/or non-GBR PRB utilization and beam utilization information. The load information requested also may include per service type radio resource usage information. The target cell 1 may respond by sending back a resource status response 866 including the requested load information of the target cell 1. Similarly, the target cell 2 may respond by sending back a resource status response 868 including the requested load information of the target cell 2. The source cell may collect the load information from target cells 1 and 2 and may send the load information to the UE 852. In particular, the load information may be communicated to the UE 852 in RRC Reconfiguration 870. The UE 852 may then use the load information of target cells 1 and 2 (and in some examples, load information of source cell) to perform cell selection and/or beam selection for a conditional handover. For example, the UE 852 may choose a target cell with a lower load among the target cells that satisfy the radio strength requirement.

Figure 9:
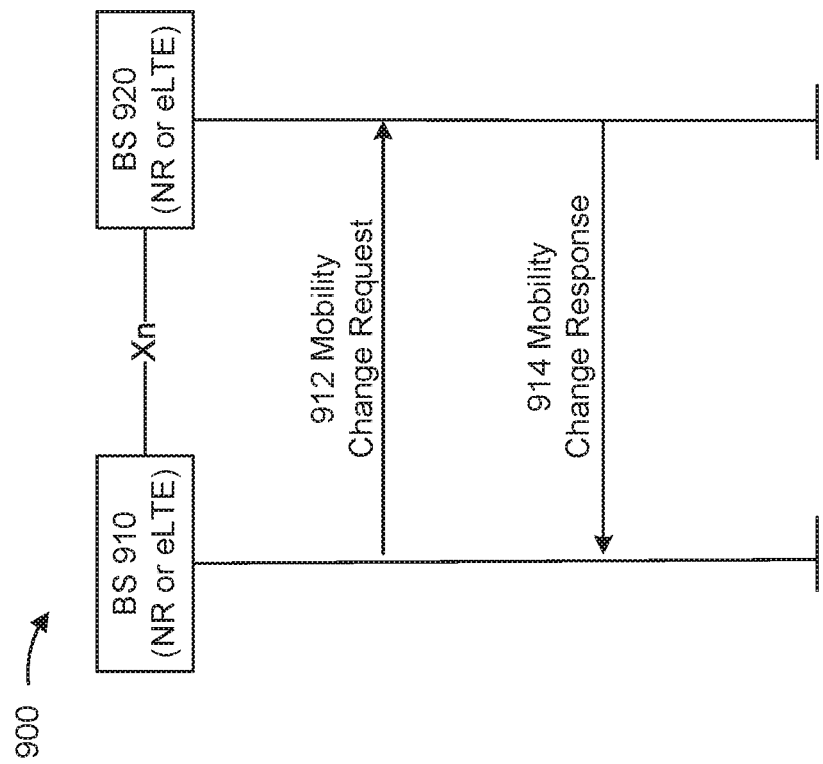
FIG. 9 is a diagram illustration an example of communication of Xn messages for negotiation of handover, in accordance with various aspects of the present disclosure.

FIG. 9 is a diagram illustration an example 900 of communication of Xn messages for negotiation of handover, in accordance with various aspects of the present disclosure. As shown in FIG. 9, base stations 910 and 920 may communicate via an Xn interface. Each one of the base stations 910 and 920 may be an NR base station or an eLTE base station. A new Xn message may be used for negotiation of handover trigger change between NG-RAN base stations, such as base stations 910 and 920. As shown in FIG. 9, base station 910 may send a mobility change request 912 to base station 920. The mobility change request 912 may include one or more requests for handover of certain UE's between the base stations. In response, base station 920 may send a mobility change response 914. The mobility change response 914 may include responses to the proposed modification (e.g., yes or no). As such, the new Xn message may allow NG-RAN stations to negotiate handover of UE's between the base stations.

Figure 10:
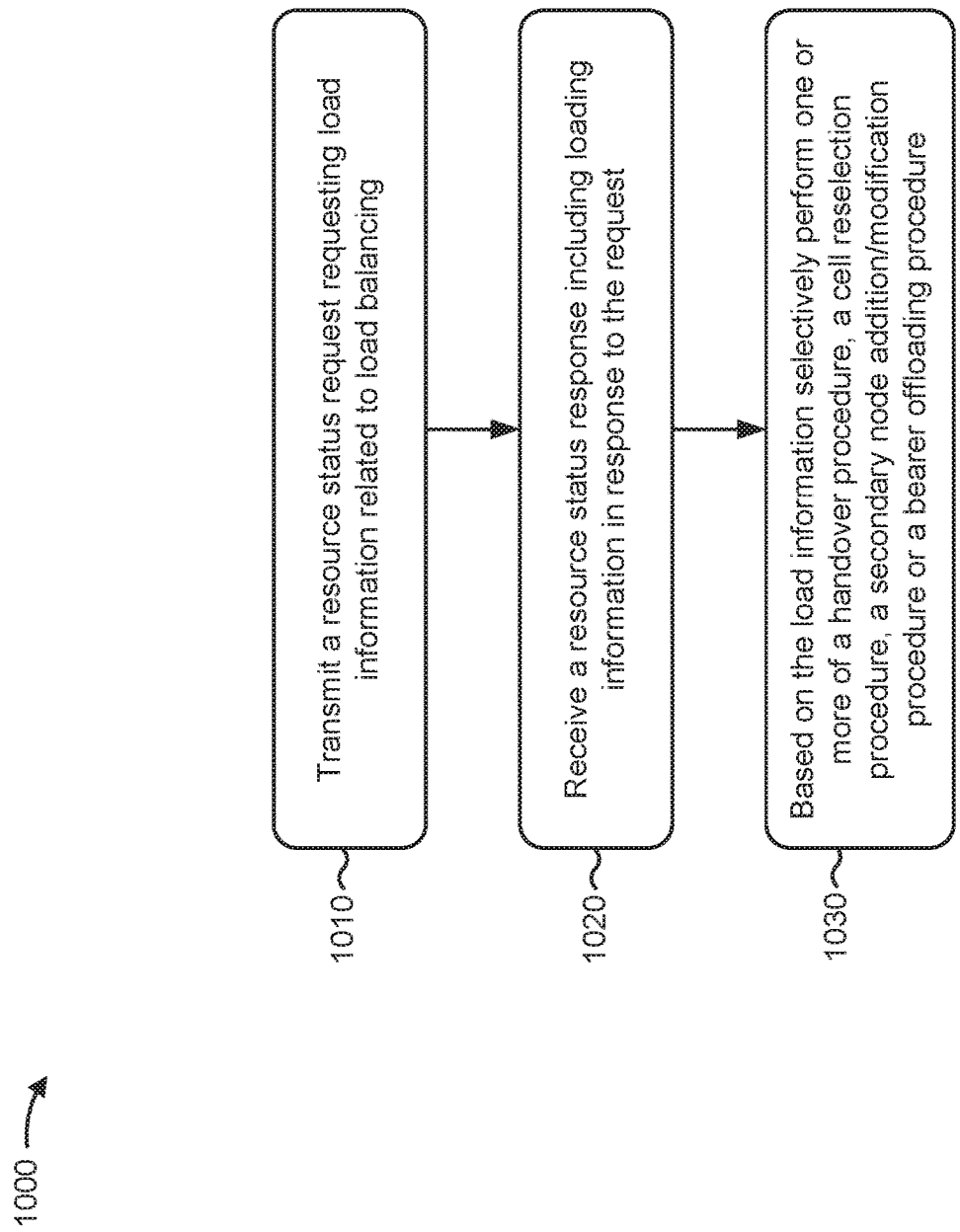
FIG. 10 is a diagram illustrating an example process performed, for example, by a wireless communication device, in accordance with various aspects of the present disclosure.

FIG. 10 is a diagram illustrating an example process 1000 performed, for example, by a wireless communication device, in accordance with various aspects of the present disclosure. Example process 1000 is an example where a wireless communication device, such as a base station 102, performs a load information communication procedure.

At 1010, the wireless communication device, such as a base station, a CU, or a DU, a target cell, or the like, may transmit a resource status request requesting load information related to load balancing. In some aspects, the load information comprises one or more of beam utilization information, per service type radio resource usage information, supplementary uplink carrier load information, hardware load information, transport network layer load information, radio resource usage information, load per bandwidth part information, a number of User Equipments (UEs) in connected mode, and a number of UEs in inactive state.

At 1020, the wireless communication device may receive a resource status response including loading information in response to the request. In some aspects, the load information may be received via and Xn or an $X_2$ communication interface from another base station. In other aspects, the load information may be received from another base station through a core network via an $S_1$ or an $N_2$ communication interface. In some aspects, the load information may be communicated via an $F_1$ communication interface between a central unit and distribute units of a base station for load balancing among the distributed unit.

At 1030, the wireless communication device may selectively perform one or more of a handover procedure, a cell reselection procedure, a secondary node addition/modification procedure or a bearer offloading procedure, based on the load information. In some aspects, the load information may be transmitted to a UE for conditional handover target cell selection by the UE.

Although FIG. 10 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 11:
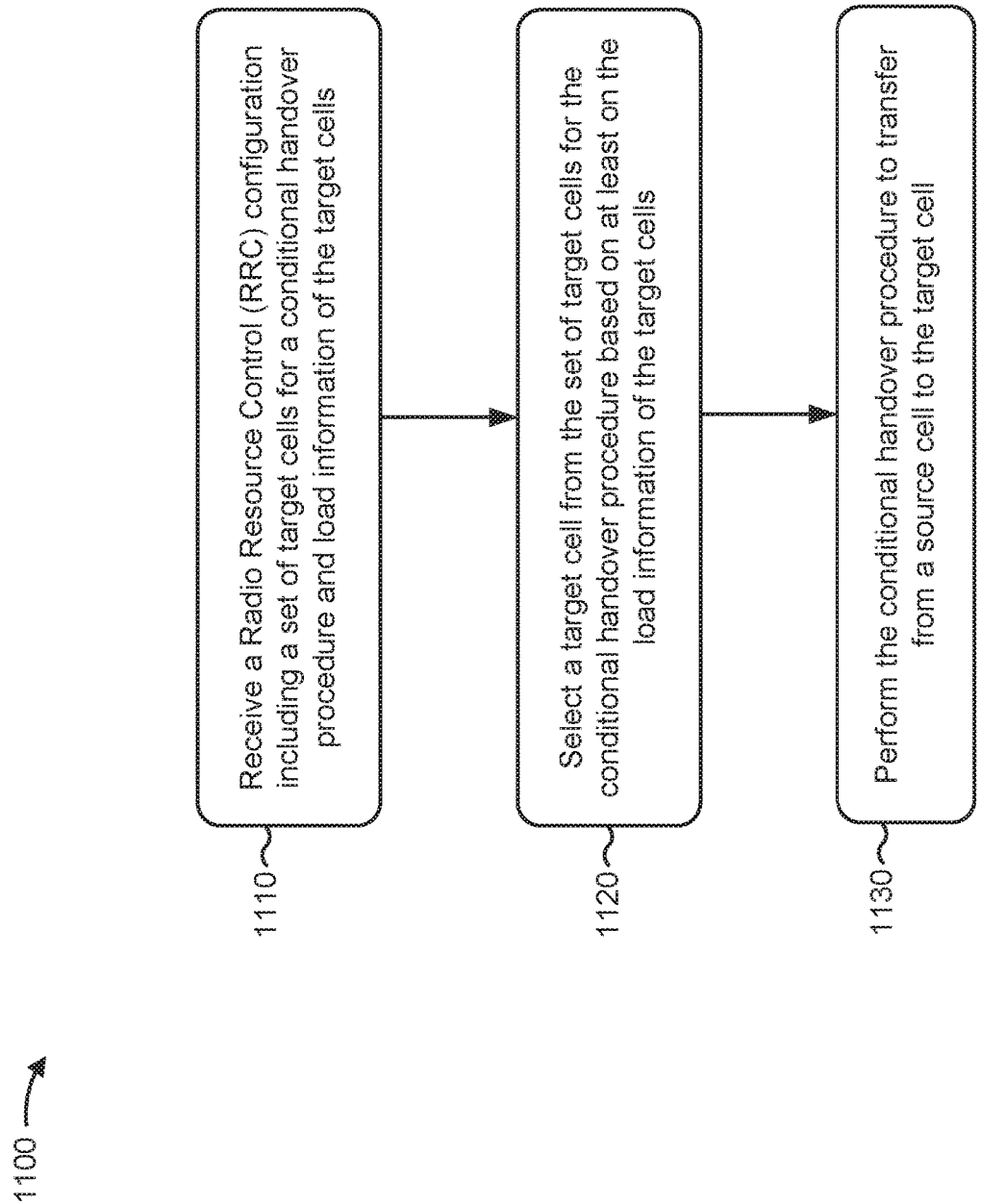
FIG. 11 is a diagram illustrating an example process performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example where a UE performs a conditional handover procedure based on load information. At 1110, the UE may receive a Radio Resource Control (RRC) configuration including a set of target cells for a conditional handover procedure and load information of the target cells. In some aspects, the load information may include one or more of beam utilization information and per service type radio resource usage information of the target cells.

At 1120, the UE may select a target cell from the set of target cells for the conditional handover procedure based at least on the load information of the target cells. In some aspects, the target cell with a lower load compared to one or more other target cells among the set of target cells is selected. At 1130, the UE may perform the conditional handover procedure to transfer from a source cell to the target cell.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, comprising:
   transmitting, from a wireless communication device, a resource status request requesting load information related to load balancing between the wireless communication device and one or more other wireless communication devices, wherein the load information comprises beam utilization information and per service type radio resource usage information;
   receiving, from a plurality of target cells, a resource status response including the load information in response to the request; and
   transmitting, to a User Equipment (UE), a Radio Resource Control (RRC) configuration including the load information in response to receiving the resource status response from the plurality of target cells.

2. The method of claim 1, further comprising receiving the load information via an Xn or an X2 communication interface.

3. The method of claim 1, further comprising receiving the load information through a core network via an Si or an N2 communication interface.

4. The method of claim 1, further comprising, based at least in part on the load information, selectively performing one or more of a handover procedure, a cell reselection procedure, a secondary node addition/modification procedure or a bearer offloading procedure.

5. The method of claim 1, wherein the load information further comprises one or more of supplementary uplink carrier load information, hardware load information, transport network layer load information, radio resource usage information, load per bandwidth part information, a number of User Equipments (UEs) in connected mode, and a number of UEs in inactive state.

6. The method of claim 1, further comprising communicating the load information via an F1 communication interface between a central unit and distributed units of a network entity, the load information for load balancing among the distributed units.

7. The method of claim 1, wherein the load information corresponds to conditional handover target cell selection.

8. A method of wireless communication at a User Equipment (UE), comprising:
   receiving, from a source cell, a Radio Resource Control (RRC) configuration including a plurality of target cells for a conditional handover procedure and load information of the plurality of target cells, wherein the source cell is distinct and separate from the plurality of target cells, and wherein the load information comprises beam utilization information and per service type radio resource usage information;

selecting a target cell from the plurality of target cells for the conditional handover procedure based at least in part on the load information; and performing the conditional handover procedure to transfer from the source cell to the target cell.

9. The method of claim 8, wherein the selecting comprises selecting the target cell with a lower load compared to one or more other target cells among the plurality of target cells.

10. An apparatus for wireless communication, the apparatus comprising:

means for transmitting, from a wireless communication device, a resource status request requesting load information related to load balancing between the wireless communication device and one or more other wireless communication devices, wherein the load information comprises beam utilization information and per service type radio resource usage information;

means for receiving, from a plurality of target cells, a resource status response including the load information in response to the request; and means for transmitting, to a User Equipment (UE), a Radio Resource Control (RRC) configuration including the load information in response to receiving the resource status response from the plurality of target cells.

11. The apparatus of claim 10, further comprising means for receiving the load information via an Xn or an X2 communication interface.

12. The apparatus of claim 10, further comprising means for receiving the load information through a core network via an S1 or an N2 communication interface.

13. The apparatus of claim 10, further comprising, based at least in part on the load information, means for selectively performing one or more of a handover procedure, a cell reselection procedure, a secondary node addition/modification procedure or a bearer offloading procedure.

14. The apparatus of claim 10, wherein the load information further comprises one or more of supplementary uplink carrier load information, hardware load information, transport network layer load information, radio resource usage information, load per bandwidth part information, a number of User Equipments (UEs) in connected mode, and a number of UEs in inactive state.

15. The apparatus of claim 10, further comprising means for communicating the load information via an F1 communication interface between a central unit and distributed units of a network entity, the load information for load balancing among the distributed units.

16. The apparatus of claim 10, wherein the load information corresponds to conditional handover target cell selection.

17. An apparatus for wireless communication, the apparatus comprising:

means for receiving, at a User Equipment (UE) and from a source cell, a Radio Resource Control (RRC) configuration including a plurality of target cells for a conditional handover procedure and load information of the plurality of target cells, wherein the source cell is distinct and separate from the plurality of target cells, and wherein the load information comprises beam utilization information and per service type radio resource usage information;

means for selecting, at a User Equipment (UE), a target cell from the plurality of target cells for the conditional handover procedure based at least in part on the load information; and means for performing, at a User Equipment (UE), the conditional handover procedure to transfer from the source cell to the target cell.

18. The apparatus of claim 17, further comprising means for selecting the target cell with a lower load compared to one or more other target cells among the plurality of target cells.

19. An apparatus for wireless communication, the apparatus comprising:

one or more memories; and one or more processors, coupled to the one or more memories, which are configured, individually or in any combination, to:

transmit, from a wireless communication device, a resource status request requesting load information related to load balancing between the wireless communication device and one or more other wireless communication devices, wherein the load information comprises beam utilization information and per service type radio resource usage information;

receive, from a plurality of target cells, a resource status response including the load information in response to the request; and transmit, to a User Equipment (UE), a Radio Resource Control (RRC) configuration including the load information in response to receiving the resource status response from the plurality of target cells.

20. The apparatus of claim 19, wherein the one or more processors are further configured, individually or in any combination, to receive the load information via an Xn or an X2 communication interface.

21. The apparatus of claim 19, wherein the one or more processors are further configured, individually or in any combination, to receive the load information through a core network via an S1 or an N2 communication interface.

22. The apparatus of claim 19, wherein the one or more processors are further configured, individually or in any combination, to, based at least in part on the load information, selectively perform one or more of a handover procedure, a cell reselection procedure, a secondary node addition/modification procedure or a bearer offloading procedure.

23. The apparatus of claim 19, wherein the load information further comprises one or more of supplementary uplink carrier load information, hardware load information, transport network layer load information, radio resource usage information, load per bandwidth part information, a number of User Equipments (UEs) in connected mode, and a number of UEs in inactive state.

24. The apparatus of claim 19, wherein the one or more processors are further configured, individually or in any combination, to communicate the load information via an F1 communication interface between a central unit and distributed units of a network entity, the load information for load balancing among the distributed units.

25. The apparatus of claim 19, wherein the load information corresponds to conditional handover target cell selection.

26. An apparatus for wireless communication, the apparatus comprising:

one or more memories; and one or more processors, coupled to the one or more memories, which are configured, individually or in any combination, to:

receive, at a User Equipment (UE) and from a source cell, a Radio Resource Control (RRC) configuration including a plurality of target cells for a conditional handover procedure and load information of the target cells, wherein the source cell is distinct and separate from the plurality of target cells, and wherein the load information comprises beam utilization information and per service type radio resource usage information;

select, at the UE, a target cell from the plurality of target cells for the conditional handover procedure based at least in part on the load information; and perform, at the UE, the conditional handover procedure to transfer from the source cell to the target cell.

27. The apparatus of claim 26, wherein the one or more processors are further configured, individually or in any combination, to select the target cell with a lower load compared to one or more other target cells among the plurality of target cells.

28. The apparatus of claim 10, wherein the radio resource usage information comprises information related to Guaranteed Bit Rate (GBR) Physical Resource Block (PRB) utilization and non-GBR PRB utilization.

29. The apparatus of claim 19, wherein the radio resource usage information comprises information related to Guaranteed Bit Rate (GBR) Physical Resource Block (PRB) utilization and non-GBR PRB utilization.

30. The apparatus of claim 26, wherein the radio resource usage information comprises information related to Guaranteed Bit Rate (GBR) Physical Resource Block (PRB) utilization and non-GBR PRB utilization.

* * * * *